United States Patent
D'Andrea

[11] 3,759,223
[45] Sept. 18, 1973

[54] AQUARIUMS

[76] Inventor: Robert A. D'Andrea, 2027 Ramblewood Rd., Baltimore, Md. 21214

[22] Filed: May 11, 1971

[21] Appl. No.: 142,247

[52] U.S. Cl. .................................................. 119/5
[51] Int. Cl. ............................................ A01k 63/00
[58] Field of Search ............................... 119/2, 3, 5

[56] References Cited
UNITED STATES PATENTS

| | | | |
|---|---|---|---|
| 3,465,718 | 9/1969 | Handman et al. | 119/2 |
| 2,594,474 | 4/1952 | McGrath | 119/5 |
| 3,122,126 | 2/1964 | Yamada | 119/3 |
| 3,179,084 | 4/1965 | Norris et al. | 119/5 |
| 3,234,905 | 2/1966 | Olson | 119/5 |
| 3,418,973 | 12/1968 | Saito | 119/3 |
| 3,557,753 | 1/1971 | Dantoni | 119/2 |

*Primary Examiner*—Aldrich F. Medbery
*Attorney*—Walter G. Finch

[57] ABSTRACT

A fish aquarium is provided which is of unique construction and arrangement so that the water used in the bottom of the aquarium, including any sediment therein, can be readily drained from the aquarium and replaced with fresh water. The aquarium consists of an enclosure having four glass walls and a top, if necessary, which can be opened or closed. The bottom of the aquarium is recessed to form a septic sump for collection of sediments, and the like. A filter is positioned above the recessed bottom of the aquarium and stones are positioned on top of the filter. The sediments in the water settle to the bottom of the base, that is, in the recessed bottom after passing through the stones and filter. The sediments and old water are periodically withdrawn from the fish aquarium through a drain spigot system connected to the septic sump through the bottom of the sides below the gravel level. The construction of the invention can apply equally well to swimming pools and the like.

5 Claims, 3 Drawing Figures

PATENTED SEP 18 1973 3,759,223

INVENTOR
ROBERT A. D'ANDREA

BY Walter G. Finch
ATTORNEY

INVENTOR
ROBERT A. D'ANDREA

BY *Walter J. Finch*
ATTORNEY

AQUARIUMS

This invention relates generally to water aeration and filtration systems for aquariums and swimming pools and the like, and more particularly it pertains to a novel system for draining water and sediments from a fish aquarium which has sediment deposits through a septic sump and replacing such water with fresh water.

In the past, the owner of a home fish aquarium would replace the water in the fish aquarium by moving the aquarium to a sink where the water was poured out or drained from the open top of the aquarium and replaced with fresh water. At the same time, any sediments therein were removed if the aquarium was completely drained. Such procedure of cleaning out a fish aquarium is time consuming, and, additionally, necessitates that the aquarium be cleaned often in order to sustain the marine life in the aquarium. Breakage of aquariums frequently occurred upon movement thereof.

It is an object of this invention, therefore, to provide a septic drainage system at the base thereof for rapidly removing old water from a fish aquarium together with the sediments deposited in the water by the fish and the like and replacing the old water and sediments with fresh water on either a continuous basis or intermittent basis.

Another object of this ivnention is to provide a simple type of fish aquarium construction which facilitates the removal of sediments from the aquarium from the bottom of a septic sump in the aquarium without replacing or removing marine or plant life.

Another object of this invention is to provide a marine aquarium which is efficient and reliable in operational use and which is easy to maintain, and because of its ability to dispose of sediments of any type whether produced by marine or plant life through the bottom septic sump.

Still another object of this invention is to provide a marine aquarium system which is easy to clean either continuously or periodically of the sediments deposited therein and to replace old water in the aquarium with fresh water.

These and other objects and attendant advantages of this invention will become more readily apparent and understood from the following detailed specification and accompanying drawings in which.

Figure 1:
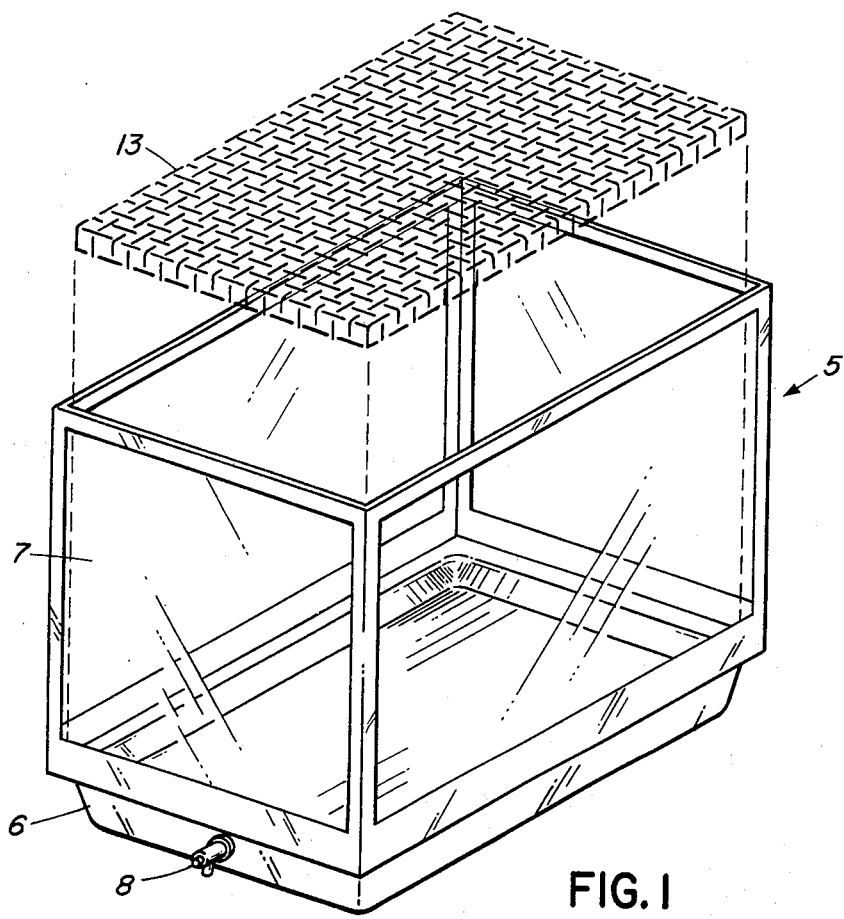
FIG. 1 is a perspective view, partly exploded, showing a marine aquarium having a recessed bottom and incorporating features of this invention.
Figure 2:
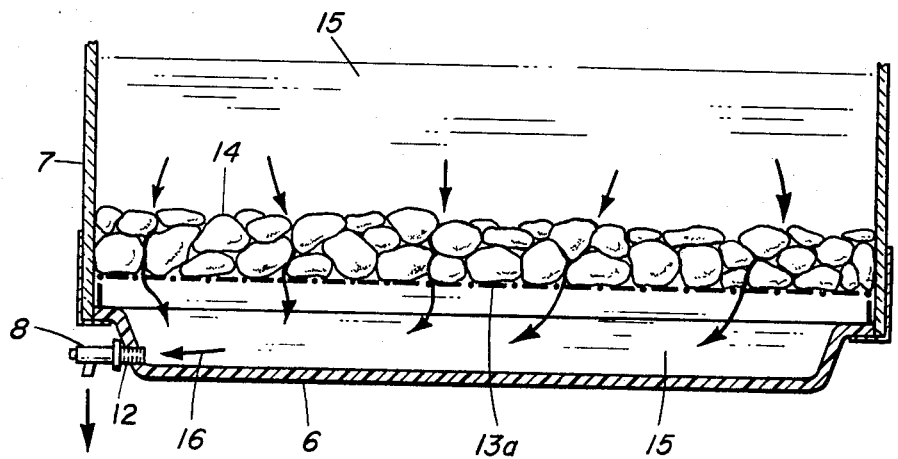
FIG. 2 is a cross vertical section taken through the longitudinal axis of the fish aquarium of FIG. 1.
Figure 3:
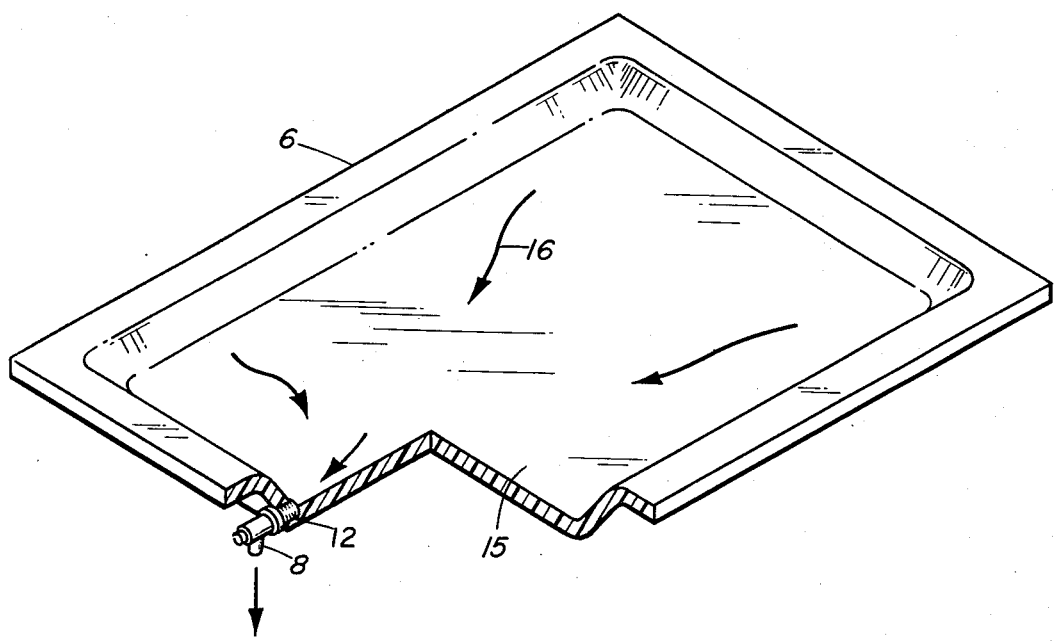
FIG. 3 is a perspective view of the recessed septic sump of the marine aquarium of FIG. 1.

Referring now to the FIGS. 1, 2, and 3 of the drawings, there is shown a fish aquarium 5 which consists of a glass enclosure formed of four vertical walls 7 and having either an open top or a top enclosed by glass, if necessary. The base of the aquarium is recessed as indicated by reference numeral 6 to form a septic sump. A ledge is formed around the periphery of the recessed base 6 of the aquarium 5 and a filter 13 is positioned on top of the ledge which surrounds the periphery of the recessed base.

Stones 14 are positioned on top of the filter 13, which is shown in position by reference numeral 13a, as indicated in FIG. 2 of the drawing. Water is placed in the aquarium 5 for the fish or other marine life in the aquarium 5.

Sediments generated by operation of the system settle to the bottom of the aquarium 5 and pass through the stones 14, as indicated by the direction of the arrows, into the recessed base 6, where they are collected.

An opening conduit 12 is provided between the recessed base 6 and a drain spigot 8 which can be utilized to withdraw the sediments which have settled in the recessed base 6 from the aquarium 5 and also to withdraw the water from the aquarium as desired either continuously or intermittently In operational use, the filter 13 is placed on the ledge surrounding the recessed base and the stones 14 are positioned on top of the filter 13. Water 15 is placed in the aquarium 5 and the fish or marine life are put into the aquarium with vegetation, food and the like.

Any sediments generated during the operation of the fish aquarium 5 pass through the stones 14 into the septic sump in the recessed base 6 and, as desired, the water and the sediments which have settled in the base of the aquarium are withdrawn by means of the drain spigot 8 at the base to facilitate the cleaning of the aquarium rapidly and easily without removing fish or plant life from the bottom or sides below the gravel line.

As previously mentioned, the same general arrangement can be utilized in connection with swimming pools, or any other tank requiring septic draining, to clean them as desired. A recess septic sump would be located at a position so that the draining pool or construction thereof will be most advantageous and will have a filter device specified.

Obviously, many modifications and variations of the present invention are possible in light of the above teachings. It is, therefore, to be understood that within the scope of the appended claims the invention may be practiced otherwise than as specifically described.

What is claimed is:

1. A marine aquarium for containing a single body of liquid, comprising, structure defining an enclosure for containing the single body of liquid having side walls and a top, if necessary, a unitary base with a recessed bottom having a base portion and generally upwardly extending side walls thereby forming a septic sump and an integral ledge extending laterally from the top of said base side walls and formed completely around the periphery thereof, said enclosure side walls extending directly upwardly from and secured to the peripheral edge of said ledge, said side walls of both said enclosure and base forming the exterior and interior side walls of the aquarium and said base portion of said base forming exterior and interior base surfaces of the aquarium, filter means positioned and supported directly on said ledge, a plurality members positioned on said filter means, and conduit means communicating with the interior base surface and extending through the side wall of the base to the exterior thereof for draining of said septic sump from the bottom of the single body of liquid and sediments.

2. A marine aquarium as recited in claim 1, wherein said filter members comprise stones.

3. A marine aquarium as recited in claim 2, wherein said filter means retains said stones above said septic sump recess.

4. A container for containing a single body of liquid, comprising, structure defining an enclosure for containing the single body of liquid having side walls and a top, if necessary, a base with a recessed bottom having a base portion and generally upwardly extending side walls thereby forming a septic sump, said side walls of said enclosure extending upwardly from the side walls of said base, said side walls of said enclosure and said base forming the exterior and interior side walls of the container and said base portion of said base forming exterior and interior base surfaces of the container, filter means positioned on top of said septic sump, a plurality of filter members positioned on said filter means, and conduit means communicating with the interior base surface and extending through the side wall of the base to the exterior thereof for draining of said septic sump from the bottom of the single body of liquid and sediments at one side of said base below the line of the filter members and in line with the bottom of said base.

5. A marine aquarium as recited in claim 1, wherein said conduit means includes a drain spigot located at the exterior side wall of base to permit selective drainage of the body of liquid and sediments.

* * * * *